INVENTORS
JOHN A. BELANICH
DELBERT C. BAARS
OLOF (NMI) KOK

Richard K. Macneill 3,373,442
PEN CARRIAGE
John A. Belanich, Delbert C. Baars and Olof Kok, San Diego, Calif., assignors, by mesne assignments, to Honeywell Inc., Minneapolis, Minn., a corporation of Delaware
Filed Jan. 25, 1965, Ser. No. 427,583
1 Claim. (Cl. 346—139)

The present invention relates to a recording pen tracking system, and, more particularly, to a recording pen tracking system utilizing a self-lubricating bearing block.

Prior art recording systems of the type having a vertical tracking carriage moving horizontally across a chart, such as X–Y recorders, have suffered the disadvantage of very complex and expensive pen carrying arrangements which must be attached to a mechanism capable of vertical tracking, while the entire carriage is pulled horizontally according to an input function. One of the more common systems is that utilizing three bearing-guide wheels which are carried within a guide channel in a vertical track. To these three bearing-guide wheels, a pair of pulley wheels must be mounted, as well as a pen holding bracket, resulting in a very cumbersome and difficult to assemble mechanism.

According to the invention, a self-lubricating bearing block, such as Teflon, is slidably mounted in a guide channel within the vertical track mechanism of a recorder. Means for sliding the bearing block along the guide channel are attached thereto, such as a pair of pulley wheels, and the pen holding bracket can then be carried by the lubricating block itself. This arrangement results in a recording pen tracking system which obviates the difficulties previously encountered with the prior art systems.

An object of the present invention is the provision of a recording pen tracking system which is extremely durable and trouble-free.

Another object is to provide a recording pen tracking system which is simple to assemble, and relatively inexpensive.

Figure 1:
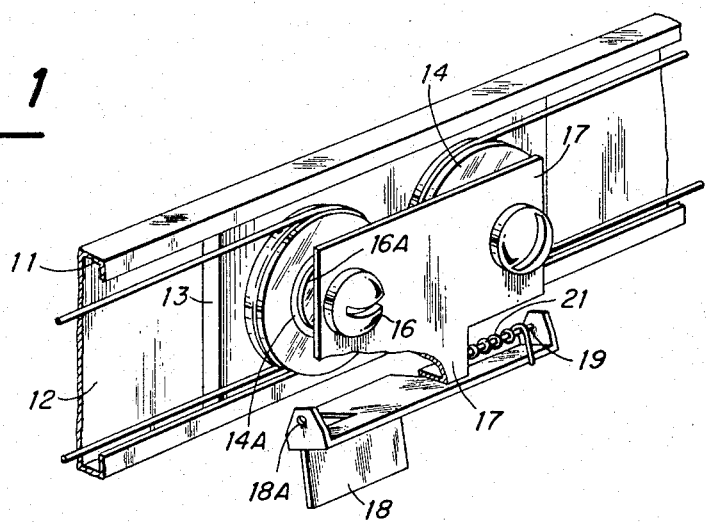
Figure 2:
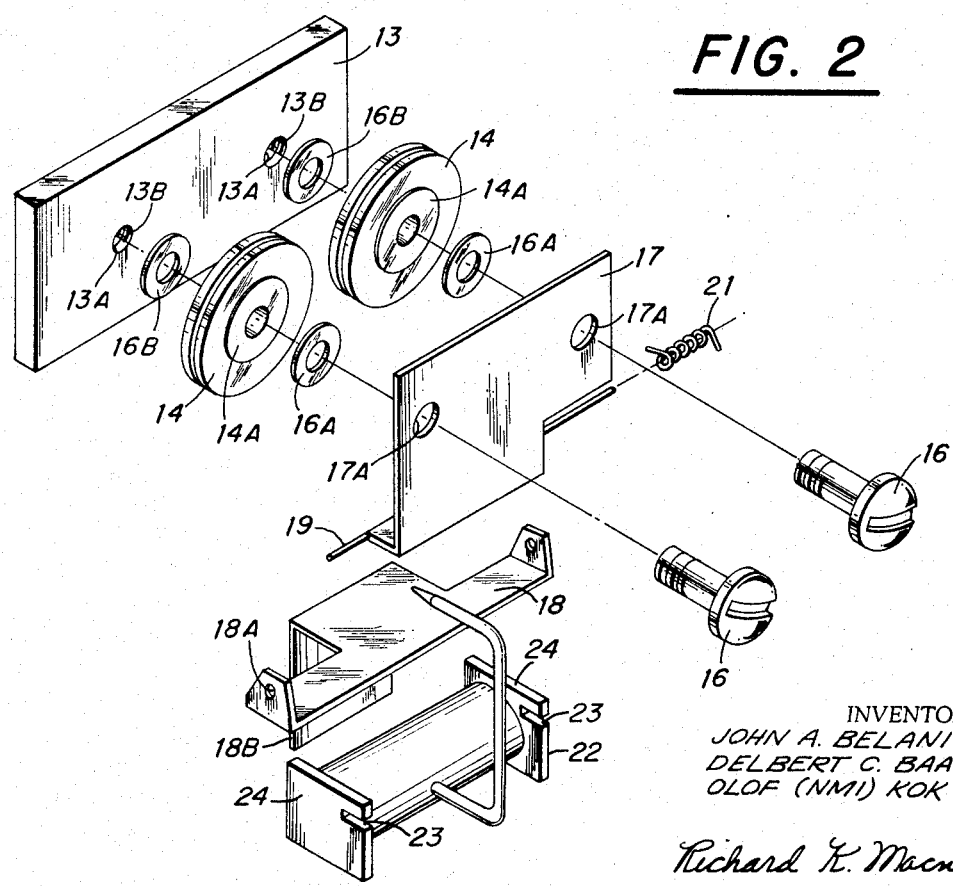

Other objects and many of the attendant advantages of this invention will be readily appreciated as the same becomes better understood by reference to the following detailed description, when considered in connection with the accompanying drawing in which like referenced numerals designate like parts throughout the figures thereof, and wherein:

FIG. 1 is a perspective view of the preferred embodiment of the recording pen tracking system of the present invention; and FIG. 2 is an exploded view of the mechanism of FIG. 1.

Referring to FIG. 1, a track 11 is shown, having a guide channel 12. Self-lubricating bearing block 13 is slidably carried within guide channel 12 and has pulley wheels 14 rotatably attached thereto by screws 16. Screws 16 also mount bracket plate 17 to bearing block 13. Bracket plate 18 is hingedly attached at 19 to bracket plate 17, and is spring biased with relation thereto by spring 21.

Referring to FIG. 2, the entire assembly of FIG. 1, with the exception of track 11, is shown in exploded form. In assembly, mounting screws 16 are passed through bores 17A on plate 17, through washers 16A, and bearings 14A of pulley wheels 14. They are then passed through washers 16B, and are threadably engaged with threads 13B of bores 13A in block 13. Hinge pin 19 is fixedly attached to plate 17. Bores 18A of bracket plate 18 are stretched around the ends of hinge pin 19 after spring 21 is placed over one end of hinge pin 19 as indicated. Recording pen 22, in the form of a self-contained unit including ink supply and pen arm, is attached to bracket plate 18 by the cooperation of slits 23 within end plates 24 of recording pen 22 and tab 18B of bracket plate 18.

Hence, it can be seen that a recording pen tracking system has been disclosed which is extremely simple to assemble, relatively inexpensive, and durable and trouble-free.

It should be understood, of course, that the foregoing disclosure relates to only a preferred embodiment of the invention, and that it is intended to cover all changes and modifications of the example of the invention herein chosen for the purposes of the disclosure, which do not constitute departures from the spirit and scope of the invention.

What is claimed is:
1. A recording pen tracking system comprising:
track means having a guide channel therein,
a single self-lubricating bearing block slidably mounted within said guide channel,
first and second pulley wheels,
means for rotatably attaching said pulley wheels to said single self-lubricating bearing block for imparting motion thereto within said guide channel,
a first plate fixedly attached to said bearing block by said means for attaching said pulley wheels,
a second plate hingedly attached to said first plate, and spring means for biasing said second plate with respect to said first plate.

References Cited
UNITED STATES PATENTS

| 2,467,808 | 4/1949 | Canada | 346—34 |
| 2,746,151 | 5/1956 | Kennedy | 33—1 |
| 2,853,358 | 9/1958 | Bedell | 346—139 |
| 2,892,666 | 6/1959 | Parker et al. | 346—139 |
| 2,943,905 | 7/1960 | Godet | 346—139 |
| 2,973,237 | 2/1961 | Whiteley | 346—29 |
| 3,019,072 | 1/1962 | Bose et al. | 346—140 |
| 3,127,678 | 4/1964 | Muldoon | 33—1 |

RICHARD B. WILKINSON, *Primary Examiner.*

J. W. HARTARY, *Assistant Examiner.*